(12) United States Patent
Liu et al.

(10) Patent No.: US 7,017,561 B1
(45) Date of Patent: Mar. 28, 2006

(54) CONTROL STRATEGY FOR EXPANDING DIESEL HCCI COMBUSTION RANGE BY LOWERING INTAKE MANIFOLD TEMPERATURE

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/072,549

(22) Filed: Mar. 3, 2005

(51) Int. Cl.
F02B 47/08 (2006.01)

(52) U.S. Cl. .............................. 123/568.12

(58) Field of Classification Search ........... 123/568.12, 123/568.11, 559.1, 563, 568.2; 60/605.2, 60/605.3
See application file for complete search history.

(56) References Cited

U.S. PATENT DOCUMENTS

| 5,740,785 | A | 4/1998 | Dickey et al. |
| 6,301,887 | B1 | 10/2001 | Gorel et al. |
| 6,347,619 | B1 | 2/2002 | Whiting et al. |
| 6,422,220 | B1 | 7/2002 | Lepp et al. |
| 6,571,765 | B1 * | 6/2003 | Kuboshima et al. ........ 123/305 |
| 6,904,898 | B1 * | 6/2005 | Sahlen .................. 123/568.12 |
| 6,918,251 | B1 * | 7/2005 | Yanagisawa et al. ...... 60/605.2 |
| 6,957,640 | B1 * | 10/2005 | Liu et al. ..................... 123/305 |
| 2004/0074480 | A1 * | 4/2004 | Chen et al. ............ 123/568.12 |
| 2004/0194463 | A1 * | 10/2004 | Yanagisawa et al. ...... 60/605.2 |

OTHER PUBLICATIONS

U.S. Appl. No. 10/809,254, filed Mar. 24, 2004, Liu et al.
U.S. Appl. No. 10/874,670, filed Jun. 23, 2004, Liu et al.
U.S. Appl. No. 10/963,076, filed Oct. 12, 2004, Liu et al.
U.S. Appl. No. 10/960,664, filed Oct. 7, 2004, Liu et al.

* cited by examiner

Primary Examiner—Mahmoud Gimie
(74) Attorney, Agent, or Firm—Dennis Kelly Sullivan; Susan L. Lukasik; Jeffrey P. Calfa

(57) ABSTRACT

An engine (10) utilizes "regular EGR cooling" when operating in HCCI mode at loads within a low load range (56, 58, 60) and "enhanced EGR cooling" that allows the engine to continue to operate in HCCI mode when engine load increases beyond loads in the low load range (64, 66, 68). When engine load increases further to a point where it enters a high load range, the combustion mode changes over to conventional diesel combustion, and exhaust gas recirculation reverts to "regular EGR cooling" (70, 72, 74).

15 Claims, 2 Drawing Sheets

CONTROL STRATEGY FOR EXPANDING DIESEL HCCI COMBUSTION RANGE BY LOWERING INTAKE MANIFOLD TEMPERATURE

FIELD OF THE INVENTION

This invention relates generally to internal combustion engines, particularly engines that selectively operate in different combustion modes, such as a Homogeneous-Charge Compression-Ignition (HCCI) combustion mode and a Conventional Diesel (CD) combustion mode. The invention provides a strategy for selectively cooling recirculated exhaust gas according to engine speed/load conditions in a manner that enables an engine to operate in the HCCI combustion mode over a larger range of speed/load conditions.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_X$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by scientists and engineers.

One aspect of HCCI seems to impose a limit on the extent to which it can provide drastically reduced tailpipe emissions of soot and $NO_X$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion.

The nature of a diesel engine and the commercial availability of fuel injection systems that can control fuel injection with great precision allow fuel to be injected as a series of individual injections during an engine cycle. Hence known fueling systems in diesel engines can serve to control injection of fuel for both CD combustion and HCCI combustion.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

Contemporary fuel injection systems allow injection pressure, injection rate, and injection timing to be controlled with high degrees of precision so that fuel can be injected into a cylinder in precise quantities at precise times during an engine cycle. That is why known fuel injection and associated processing systems can handle both CD and HCCI combustion. An engine that can operate selectively in a CD combustion mode and an HCCI combustion mode depending on factors such as speed and load is sometimes called a hybrid HCCI diesel engine.

Several pending U.S. Patent Applications of the inventors disclose engines, systems, and methods for operating diesel engines selectively in different combustion modes including HCCI and CD modes. Those inventions take advantage of the capabilities of known fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Pre-mixed Combustion Systems (HPCS).

By whatever name an alternative combustion system or process may be called, a common attribute is that fuel is injected into a cylinder well before TDC to form an air-fuel charge that is increasingly compressed until auto-ignition occurs near or at top dead center (TDC).

It is commonly known that limiting peak combustion temperatures in an engine can aid in reducing the amount of undesired products of combustion in engine exhaust. Exhaust gas recirculation (EGR) is commonly used in internal combustion engines to aid in limiting peak combustion temperatures. A variety of known EGR strategies are described in various patents and technical literature. The amount of exhaust gas recirculated is typically controlled according to how the engine is being operated. At some times more exhaust gas is recirculated, at other times less.

It is also known to have more than one EGR valve in an engine and to selectively use them according to how the engine is being operated. It is also known to use a heat exchanger, i.e. a cooler, to cool recirculated exhaust gas.

SUMMARY OF THE INVENTION

The present invention relates to a compression ignition engine that at times operates in an alternative diesel combustion mode like HCCI and that, when operating in that mode, utilizes EGR in a way that enables HCCI to be used over a larger range of engine speeds and loads.

Briefly, the invention utilizes what will be sometimes called "regular EGR" when the engine is operating in HCCI mode at loads within a low load range, and what will be sometimes called "enhanced EGR" that allows the engine to continue to operate in HCCI mode when engine load increases beyond loads in the low load range. When engine load increase further to a point where it enters a high load range, the combustion mode changes over to conventional diesel combustion, and exhaust gas recirculation reverts to "regular EGR".

By extending the load range over which a compression ignition engine can operate in an alternative diesel combustion mode such as HCCI, such an engine can generate less undesirable combustion products in exhaust gases without significantly compromising engine performance.

The invention is embodied by particular programming of an engine control strategy in a processor of an engine control unit and by the inclusion of "enhancing EGR" apparatus that is additional to "regular EGR" apparatus. In accordance with principles of the invention, the "enhancing EGR" apparatus is used in conjunction with alternative diesel combustion when the engine is operating in a medium load range that is between the low load range and the high load range.

In the disclosed preferred embodiment of the invention, the "enhancing EGR" apparatus includes an enhancing EGR cooler that provides additional cooling to the exhaust gas that is being recirculated. The additional cooling enables alternative diesel combustion to be used over an expanded load range in a diesel engine by lowering intake manifold temperature. The lowered intake manifold temperature acts to increase gas density, reduce peak pressures, and lower peak temperatures in the engine cylinders, allowing a diesel engine to operate at medium loads in an alternative diesel combustion mode.

Consequently, the present invention enables a diesel engine to work in a basic alternative diesel combustion mode, such as HCCI combustion mode, at low loads, in an enhancing alternative diesel combustion mode at medium loads, and in the conventional diesel combustion mode at high loads.

One generic aspect of the present invention relates to a method of operating a compression ignition engine.

The method comprises processing data indicative of engine load.

When a result of processing data indicative of engine load discloses engine load in a low load range, the engine is fueled to operate by alternative diesel combustion and recirculated exhaust gas passes through a first EGR cooler, but not a second EGR cooler.

When a result of processing data indicative of engine load discloses engine load in a medium load range comprising loads greater than those of the low load range, the engine is fueled to operate by alternative diesel combustion and recirculated exhaust gas passes through both the first EGR cooler and the second EGR cooler.

When a result of processing data indicative of engine load discloses engine load in a high load range comprising loads greater than those of the medium load range, the engine is fueled to operate by conventional diesel combustion and recirculated exhaust gas passes through the first EGR cooler, but not the second EGR cooler.

Another generic aspect of the invention relates to a compression ignition engine comprising a control system for processing data, one or more combustion chambers, an intake system for conveying charge air to the one or more combustion chambers, a fueling system for injecting fuel into the one or more combustion chambers, an exhaust system for conveying exhaust gases from the one or more combustion chambers, and an exhaust gas recirculation (EGR) system for recirculating some of the exhaust gases to the intake system.

When the control system's processing of data indicative of engine load discloses engine load in a low load range, it causes the engine to be fueled to operate by alternative diesel combustion and recirculated exhaust gas to pass through a first EGR cooler, but not a second EGR cooler.

When the control system's processing of data indicative of engine load discloses engine load in a medium load range comprising loads greater than those of the low load range, it causes the engine to be fueled to operate by alternative diesel combustion and recirculated exhaust gas to pass through both the first EGR cooler and the second EGR cooler.

When the control system's processing of data indicative of engine load discloses engine load in a high load range comprising loads greater than those of the medium load range, it causes the engine to be fueled to operate by conventional diesel combustion and recirculated exhaust gas to pass through the first EGR cooler, but not the second EGR cooler.

Still another generic aspect relates to a compression ignition engine comprising a control system for processing data, one or more combustion chambers, an intake system for conveying charge air to the one or more combustion chambers, a fueling system for injecting fuel into the one or more combustion chambers, an exhaust system for conveying exhaust gases from the one or more combustion chambers, and an exhaust gas recirculation (EGR) system for recirculating some of the exhaust gases to the intake system.

The EGR system comprises a first EGR cooler through which flow of recirculated exhaust gases can be selectively restricted and a second EGR cooler through which flow of recirculated exhaust gases can be selectively restricted.

The control system processes data indicative of engine load, and when a result of processing data indicative of engine load discloses engine load in a first load range, the control system causes the fueling system to fuel the engine for operation by alternative diesel combustion and causes the EGR system to prohibit flow of exhaust gases through one of the EGR coolers while selectively restricting flow of exhaust gases through the other EGR cooler.

When a result of the control system's processing of data indicative of engine load discloses engine load in a second load range comprising loads greater than those of the first load range, the control system causes the fueling system to fuel the engine for operation by alternative diesel combustion and causes the EGR system to selectively restrict flow of exhaust gases through both EGR coolers.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE PREFERRED EMBODIMENT

Figure 1:
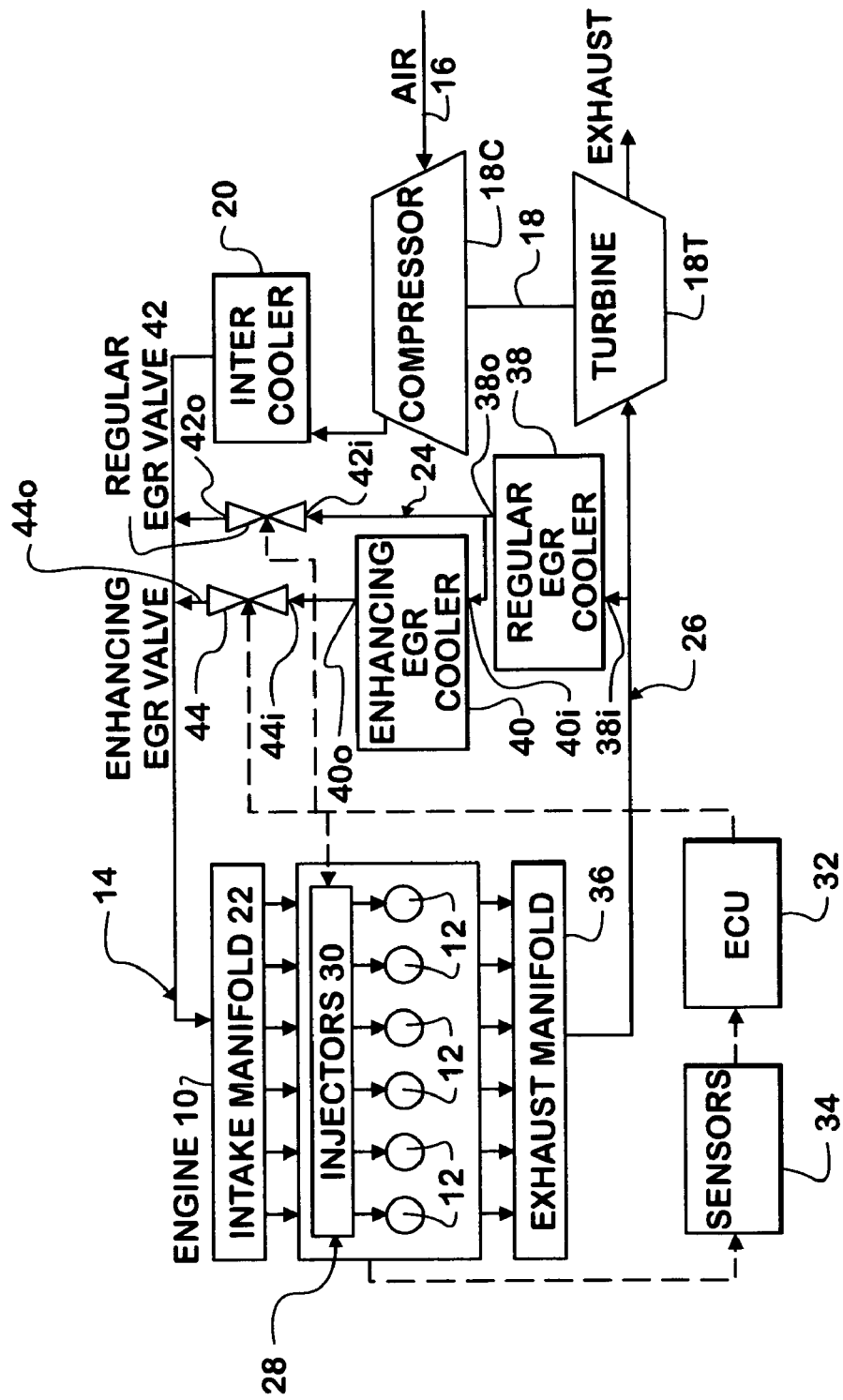
FIG. 1 is a general schematic diagram of portions of an exemplary diesel engine embodying principles of the present invention.

FIG. 1 shows a portion of an exemplary diesel engine 10 operating in accordance with the inventive strategy for powering a motor vehicle. Engine 10 comprises cylinders 12 within which pistons reciprocate. Each piston is coupled to a respective throw of a crankshaft by a corresponding connecting rod. Intake air is delivered to each cylinder through an intake system 14.

Intake system 14 comprises a fresh air inlet 16 to a compressor 18C of a turbocharger 18. After it has been compressed by compressor 18C, the fresh air is cooled by an intercooler 20 before passing to an intake manifold 22. Air enters a respective cylinder 12 when a respective intake valve or valves at the cylinder is or are open.

For emission control, engine 10 has an exhaust gas recirculation (EGR) system 24 that provides controlled recirculation of engine exhaust gases from an exhaust system 26 of engine 10 to intake system 14.

Engine 10 has a fueling system 28 that comprises fuel injectors 30 for cylinders 12. The engine also has a processor-based engine control unit (ECU) 32 that processes data from various sources to develop various control data for controlling various aspects of engine operation, including fueling system 28 and EGR system 24.

The data processed by ECU 32 may originate at external sources, such as various sensors, 34 generally, and/or be generated internally. Examples of data processed may include engine speed, intake manifold pressure, exhaust manifold pressure, fuel injection pressure, fueling quantity and timing, mass airflow, and accelerator pedal position.

The processing system embodied in ECU 32 can process data sufficiently fast to calculate, in real time, the timing and duration of device actuation to set both the timing and the amount of each injection of fuel into a cylinder. Such control capability is used to provide both alternative diesel combustion and conventional diesel combustion.

Exhaust system 26 comprises an exhaust manifold 36 of engine 10 and a turbine 18T of turbocharger 18. It may also include one or more exhaust treatment devices (not specifically shown) such as a diesel particulate filter (DPF) for trapping soot in the exhaust so that the trapped soot does not escape to the surrounding atmosphere.

In accordance with principles of the invention, EGR system 24 comprises plural EGR coolers, specifically a regular EGR cooler 38 and an enhancing EGR cooler 40 in the illustrated embodiment. System 24 also comprises plural EGR valves, specifically a regular EGR valve 42 and an enhancing EGR valve 44 in the illustrated embodiment.

Regular EGR cooler 38 has an inlet 38i in communication with exhaust system 26 and a outlet 38o that is in communication both with an inlet 40i of enhancing EGR cooler 40 and an inlet 42i of regular EGR valve 42. Regular EGR valve 42 has an outlet 42o in communication with intake systemc14. Enhancing EGR cooler 40 has an outlet 40o in communication with an inlet 44i of enhancing EGR valve 44. Enhancing EGR valve 44 has an outlet 44o in communication with intake system 14.

Exhaust gases from exhaust manifold 36 are thereby communicated to inlet 38i. When EGR system 24 allows exhaust gases to be recirculated, the recirculated exhaust gases flow into intake manifold 22.

Both EGR valves are under the control of ECU 32. ECU 32 uses instantaneous engine load to select a particular combustion mode for operating engine 10, either an alternative diesel combustion mode, such as HCCI mode, or conventional diesel combustion mode for creating CD combustion, and to then operate the fueling system to fuel the engine according to the strategy of the selected mode. ECU also coordinates control of EGR valves 42, 44 with the selected combustion mode to coordinate use of EGR coolers 38, 40 with the selected combustion mode.

Figure 2:
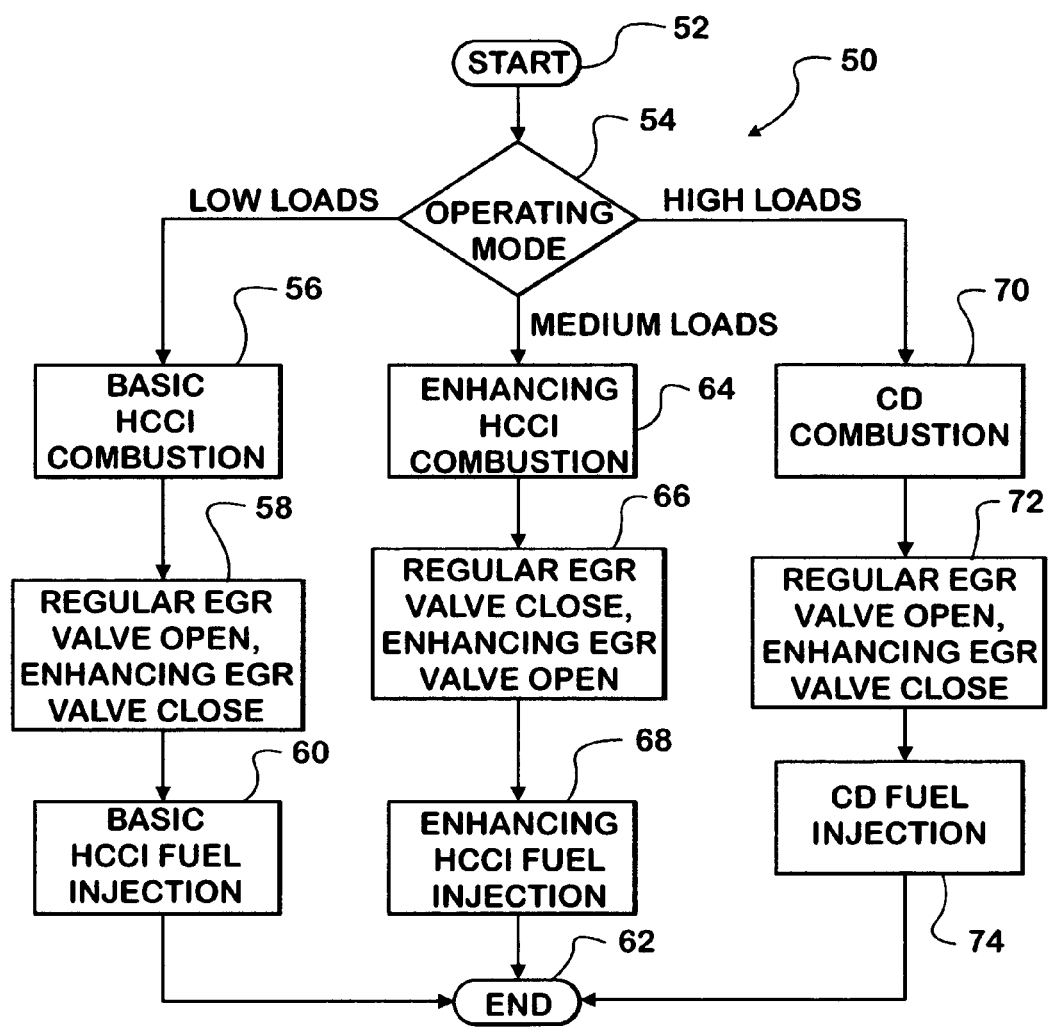
FIG. 2 is a flow diagram illustrating an embodiment of the inventive strategy for the engine of FIG. 1.

FIG. 2 shows a flow diagram 50 for a control strategy that implements principles of the invention in ECU 32. A processor of ECU 32 repeatedly iterates an algorithm that is programmed in the processor in accordance with flow diagram 50. Each iteration begins at a start 52. A step 54 processes engine load data to determine if current engine load is within a low load range, a medium load range, or a high load range.

When processing performed by step 54 discloses that current load is in the low load range, ECU 32 causes fueling system 28 to fuel engine 10 for operation by alternative diesel combustion—basic HCCI combustion is shown by example in FIG. 2—and EGR system 24 to pass recirculated exhaust gas through regular EGR cooler 38, but not enhancing EGR cooler 40. This low range is marked by reference numerals 56, 58, 60 in FIG. 2. Enhancing EGR valve 44 is operated closed by ECU 32 to prohibit flow through enhancing EGR cooler 40. While valve 44 is closed, ECU 32 controls the extent to which regular EGR valve 42 is open thereby selectively restricting flow of exhaust gases through regular EGR cooler 38 as appropriate to specific engine operation. After each iteration's selection for control of fueling and EGR, the algorithm comes to an end 62 to await the next iteration.

When processing performed by step 54 discloses that current load is in the medium load range, ECU 32 causes fueling system 28 to fuel engine 10 for operation by alternative diesel combustion—enhancing HCCI combustion is shown by example in FIG. 2—and EGR system 24 to pass recirculated exhaust gas through both regular EGR cooler 38 and enhancing EGR cooler 40. This medium range is marked by reference numerals 64, 66, 68 in FIG. 2. Regular EGR valve 42 is operated closed by ECU 32 to prohibit flow through itself. While valve 42 is closed, ECU 32 controls enhancing EGR valve 44 to selectively restrict flow of exhaust gases through both regular EGR cooler 38 and enhancing EGR cooler 40 as appropriate to specific engine operation during medium loads. The enhanced cooling of recirculated exhaust gases provided by series flow through two coolers enables alternative diesel combustion to be used in the middle load range.

When processing performed by step 54 discloses that current load is in the high load range, ECU 32 causes fueling system 28 to fuel engine 10 for operation by conventional diesel combustion and EGR system 24 to pass recirculated exhaust gas through regular EGR cooler 38, but not enhancing EGR cooler 40. This high range is marked by reference numerals 70, 72, 74 in FIG. 2. Enhancing EGR valve 44 is operated closed by ECU 32 to prohibit flow through enhancing EGR cooler 40. While valve 44 is closed, ECU 32 controls the extent to which regular EGR valve 42 is open thereby selectively restricting flow of exhaust gases through regular EGR cooler 38 as appropriate to specific engine operation in the high load range.

Selection of HCCI combustion mode causes the engine to be fueled using a fuel injection map, or maps, that result in HCCI combustion. Selection of CD combustion mode causes the engine to be fueled using a fuel injection map, or maps, that result in CD combustion. EGR may also be controlled by its own map, or maps.

The HCCI phase may have one or more discrete injections. The CD phase may also have one or more discrete injections. The invention may be used in engines of various sizes including heavy-duty, medium-duty, and light-duty diesel engines. The algorithm for the invention can be implemented in the processor, provided that the processor has sufficient capacity. The only additional devices required in the illustrated embodiment in comparison to an engine that already has one larger EGR cooler, or perhaps two smaller EGR coolers, and one EGR valve are an additional enhancing EGR cooler and a second EGR valve.

While a presently preferred embodiment of the invention has been illustrated and described, it should be appreciated that principles of the invention apply to all embodiments falling within the scope of the following claims.

What is claimed is:

1. A method of operating a compression ignition engine comprising:
   processing data indicative of engine load,
   when a result of processing data indicative of engine load discloses engine load in a low load range, fueling the engine to operate by alternative diesel combustion and passing recirculated exhaust gas through a first EGR cooler, but not a second EGR cooler,
   when a result of processing data indicative of engine load discloses engine load in a medium load range comprising loads greater than those of the low load range, fueling the engine to operate by alternative diesel combustion and passing recirculated exhaust gas through both the first EGR cooler and the second EGR cooler, and
   when a result of processing data indicative of engine load discloses engine load in a high load range comprising loads greater than those of the medium load range, fueling the engine to operate by conventional diesel combustion and passing recirculated exhaust gas through the first EGR cooler, but not the second EGR cooler.

2. A method as set forth in claim 1 wherein when a result of processing data indicative of engine load discloses engine load in either the low load range or the high load range, preventing exhaust gas from passing through the second EGR cooler by closing a valve that is in series flow relation with the second EGR cooler.

3. A method as set forth in claim 2 wherein when a result of processing data indicative of engine load discloses engine load in either the low load range or the high load range, selectively restricting the passage of recirculated exhaust gas through the first EGR cooler by controlling the extent to which a valve that is in series flow relation with the first EGR cooler is open.

4. A method as set forth in claim 1 wherein when a result of processing data indicative of engine load discloses engine load in the medium load range, causing recirculated exhaust gas to pass first through one of the EGR coolers and then the other EGR cooler.

5. A method as set forth in claim 4 wherein when a result of processing data indicative of engine load discloses engine load in the medium load range, causing recirculated exhaust gas to pass first through the first EGR cooler and then through the second EGR cooler.

6. A compression ignition engine comprising:
   a control system for processing data;
   one or more combustion chambers;
   an intake system for conveying charge air to the one or more combustion chambers;
   a fueling system for injecting fuel into the one or more combustion chambers;
   an exhaust system for conveying exhaust gases from the one or more combustion chambers;
   an exhaust gas recirculation (EGR) system for recirculating some of the exhaust gases to the intake system;
   wherein the control system processes data indicative of engine load, and when a result of processing data indicative of engine load discloses engine load in a low load range, the control system causes the fueling system to fuel the engine for operation by alternative diesel combustion and causes the EGR system to pass recirculated exhaust gas through a first EGR cooler, but not a second EGR cooler,
   when a result of processing data indicative of engine load discloses engine load in a medium load range comprising loads greater than those of the low load range, the control system causes the fueling system to fuel the engine for operation by alternative diesel combustion and causes the EGR system to pass recirculated exhaust gases through both the first EGR cooler and the second EGR cooler, and
   when a result of processing data indicative of engine load discloses engine load in a high load range comprising loads greater than those of the medium load range, the control system causes the fueling system to fuel the engine for operation by conventional diesel combustion and causes the EGR system to pass recirculated exhaust gases through the first EGR cooler, but not the second EGR cooler.

7. An engine as set forth in claim 6 including a valve that is in series flow relation with the second EGR cooler and that is operated closed when a result of processing data indicative of engine load discloses engine load in either the low load range or the high load range for preventing exhaust gases from passing through the second EGR cooler.

8. An engine as set forth in claim 7 including another valve that is in series flow relation with the first EGR cooler and that is selectively restricted to control the passage of recirculated exhaust gases through the first EGR cooler when a result of processing data indicative of engine load discloses engine load in either the low load range or the high load range.

9. An engine as set forth in claim 6 wherein the EGR coolers are arranged in flow relation such that when a result of processing data indicative of engine load discloses engine load in the medium load range, recirculated exhaust gases pass first through one of the EGR coolers and then the other EGR cooler.

10. An engine as set forth in claim 9 wherein the EGR coolers are also arranged such that when a result of processing data indicative of engine load discloses engine load in the medium load range, recirculated exhaust gases pass first through the first EGR cooler and then through the second EGR cooler.

11. A compression ignition engine comprising:
    a control system for processing data;
    one or more combustion chambers;
    an intake system for conveying charge air to the one or more combustion chambers;

a fueling system for injecting fuel into the one or more combustion chambers;

an exhaust system for conveying exhaust gases from the one or more combustion chambers;

an exhaust gas recirculation (EGR) system for recirculating some of the exhaust gases to the intake system comprising a first EGR cooler through which flow of recirculated exhaust gases can be selectively restricted and a second EGR cooler through which flow of recirculated exhaust gases can be selectively restricted;

wherein the control system processes data indicative of engine load, and when a result of processing data indicative of engine load discloses engine load in a first load range, the control system causes the fueling system to fuel the engine for operation by alternative diesel combustion and causes the EGR system to prohibit flow of exhaust gases through one of the EGR coolers while selectively restricting flow of exhaust gases through the other EGR cooler, when a result of processing data indicative of engine load discloses engine load in a second load range comprising loads greater than those of the first load range, the control system causes the fueling system to fuel the engine for operation by alternative diesel combustion and causes the EGR system to selectively restrict flow of exhaust gases through both EGR coolers.

12. An engine as set forth in claim 11 wherein the first and second EGR coolers are in series flow relationship.

13. An engine as set forth in claim 12 wherein the first EGR cooler has an inlet in communication with the exhaust system and a outlet that is in communication both with an inlet of the second EGR cooler and an inlet of a first EGR valve that has an outlet in communication with the intake system, and the second EGR cooler has an outlet in communication with an inlet of a second EGR valve that has an outlet in communication with the intake system.

14. An engine as set forth in claim 13 wherein the first EGR valve is operated closed and the second EGR valve is operated to selectively restrict flow of exhaust gases through both EGR coolers when a result of processing data indicative of engine load discloses engine load in the second load range, and the second EGR valve is operated closed and the first EGR valve is operated to selectively restrict flow of exhaust gases through itself when a result of processing data indicative of engine load discloses engine load in the first load range.

15. An engine as set forth in claim 11 wherein when a result of processing data indicative of engine load discloses engine load in a third load range comprising loads greater than those of the first and second load ranges, the control system causes the fueling system to fuel the engine for operation by conventional diesel combustion and causes the EGR system to prohibit flow of exhaust gases through the one EGR cooler.

* * * * *